United States Patent [19]
Richmond et al.

[11] 3,907,410
[45] Sept. 23, 1975

[54] INTEGRAL VERTICAL PLAN ADJUSTING MECHANISM FOR EYE GLASSES

[76] Inventors: Rex Richmond; Jack Moriarity; George Spector, all of 3615 Woolworth Bldg., 233 Broadway, New York, N.Y. 10007

[22] Filed: Nov. 27, 1973

[21] Appl. No.: 419,266

[52] U.S. Cl. .................. 351/119; 351/60; 351/120; 351/153
[51] Int. Cl.² ...................... G02C 5/14; G02C 5/22
[58] Field of Search ............................... 351/59–60, 351/115, 119–120, 153

[56] References Cited
UNITED STATES PATENTS

| | | | |
|---|---|---|---|
| 1,252,126 | 1/1918 | Letzeisen | 351/120 |
| 2,107,102 | 2/1938 | Catron, Jr. | 351/120 |
| 2,172,959 | 9/1939 | Hirtenstein | 351/119 |

FOREIGN PATENTS OR APPLICATIONS

| | | | |
|---|---|---|---|
| 1,288,299 | 2/1962 | France | 351/59 |
| 368,640 | 5/1963 | Switzerland | 351/120 |

*Primary Examiner*—Alfred E. Smith
*Assistant Examiner*—Wm. H. Punter

[57] ABSTRACT

A mechanism incorporated into the eye glasses frame in order that temple bars are comfortably rested behind the ears while at a same time the plane of the eye glasses lens are at a proper angle respective to a line of sight through them; the mechanism consisting of a pair of frictionally engagable, face plates on each temple bar, and each temple bar consisting of two legs one of which is hingedly connected to the lens frame and the other of which rests behind the ear, each of the legs having one of the face plates secured thereto, the face plates being rotatably adjustable respective to each other so that the vertical angle between the temple bar legs is selectively adjustable.

2 Claims, 15 Drawing Figures

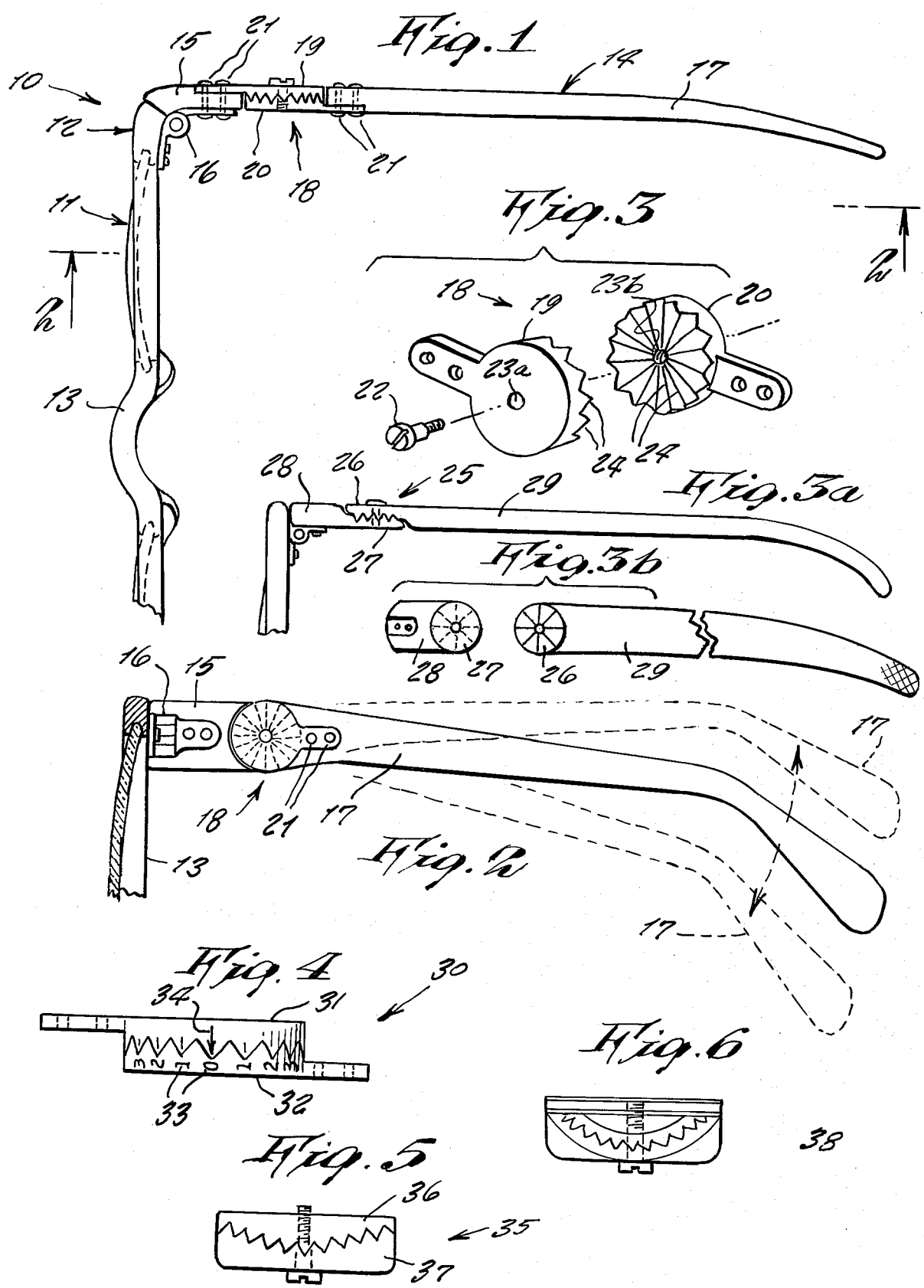

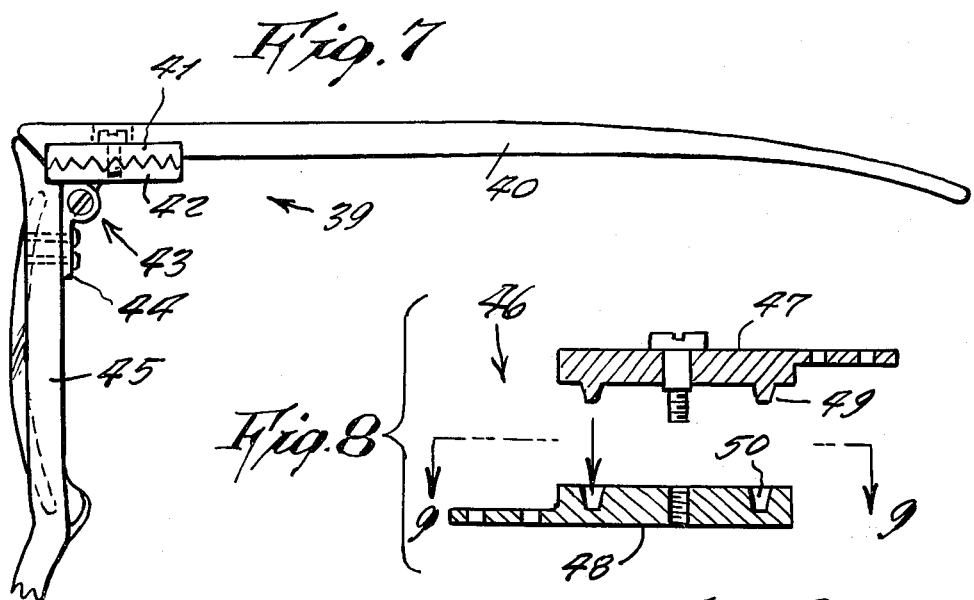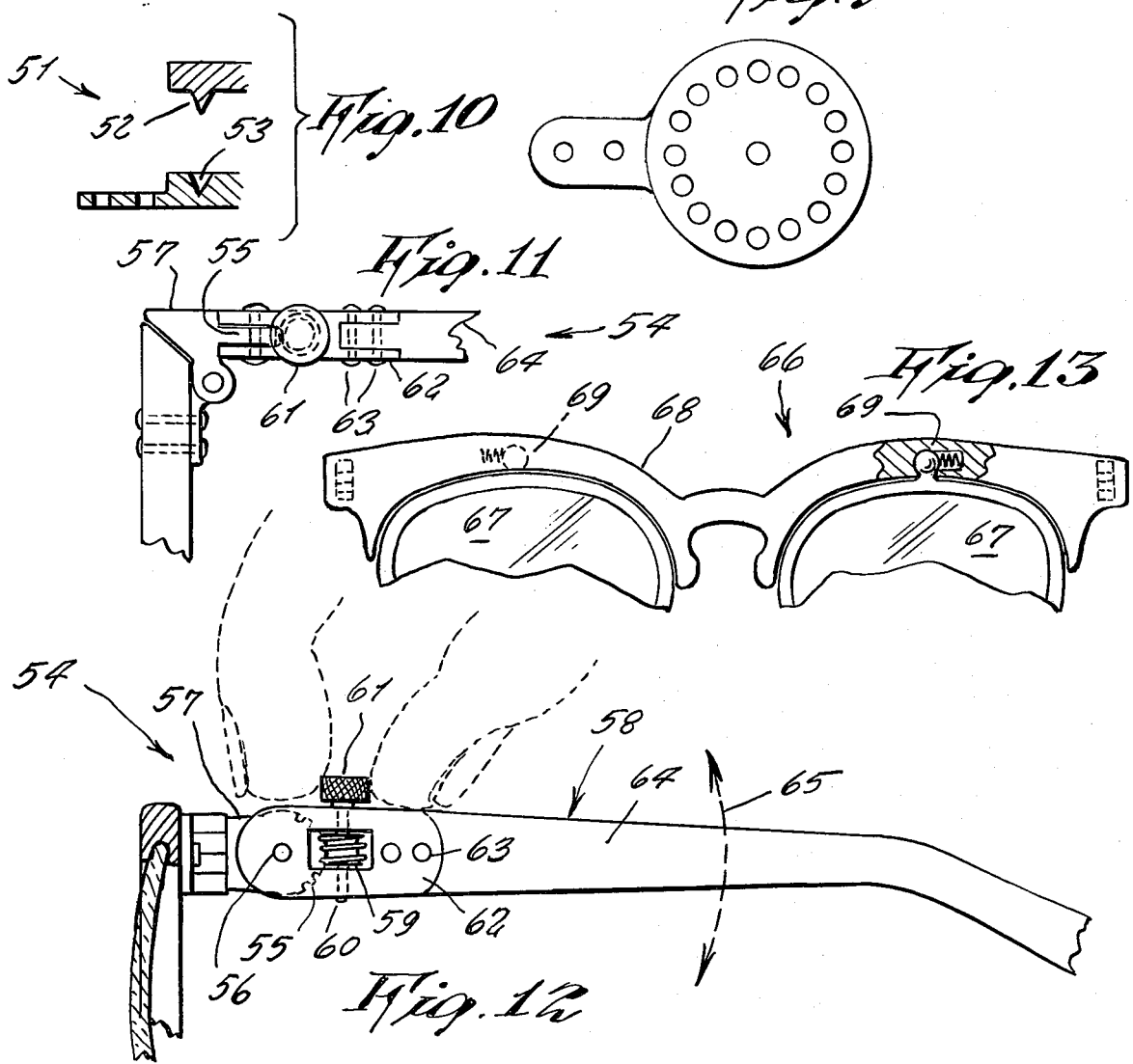

INTEGRAL VERTICAL PLAN ADJUSTING MECHANISM FOR EYE GLASSES

This invention relates generally to eye glasses.

A principle object of the present invention is to provide a mechanism whereby the vertical angle of the lens respective to a vertical angle of the temple bows is selectively controllable.

Another object is to provide a mechanism whereby accordingly the temple bows can be comfortably rested behind the ears instead of resting against a higher side of the head.

Still another object is to provide a mechanism whereby accordingly the lens can be inclined at a vertical angle that is ideal for a line of sight passing therethrough so that a perfect visibility is possible without any distortion.

Other objects are to provide a vertical plane adjusting mechanism which is simple in design, inexpensive to manufacture, rugged in construction, easy to use and efficient in operation.

These and other objects will be readily evident upon a study of the following specification and the accompanying drawings wherein:

FIG. 1 is a top view showing one disign of the invention.

FIG. 2 is a cross sectional view in direction 2—2 of FIG. 1.

FIG. 3 is a perspective view of the components of the temple bar angling unit.

FIG. 3a is a top view of a modified design of the invention.

FIG. 3b is a side view thereof.

FIG. 4 is a top view of another modified design of angling unit.

FIG. 5 is another modified design thereof.

FIG. 6 is still another modified design thereof.

FIG. 7 is a top view of still another modified design of the invention.

FIG. 8 is a cross sectional view of still another angling unit.

FIG. 9 is a face view of one of the angling unit face plates are viewed on line 9—9 of FIG. 8.

FIG. 10 is a view similar to FIG. 8 shown fragmentarily and showing another modified design.

FIGS. 11 and 12 show top and side views respectively of still another modifed design of the invention which allows fine adjustment.

FIG. 13 shows still another modified design in which each lens is individually universally adjustable in all direction, thus eliminating any angling units at the emple bars.

Referring now to the drawings in detail, the reference numeral 10 in FIGS. 1, 2 and 3 represents an integral vertical plane adjusting mechanism according to the present invention wherein there is an eye glasses 11 that includes a frame assembly 12 consisting of lens frame 13 and temple bars 14. In the present invention each temple bar 14 consists of one leg 15 secured pivotally by hinge 16 to lens frame 13, and a leg or outer portion 17 for resting behind a person's ear. The temple bar 14 also encludes angling unit 18 consisting of a pair of frictionally engagable circular face plates 19 and 20, each of the legs having one of the face plates secured thereto by rivets 21. A screw or pivot pin 22 through the center of the face plates serves to hold them tightly togehter, plate 19 having a clearance hole 23a and plate 20 having a threaded hole 23b for the screw. Radial teeth 24 on each face plate form meshed corrugations in a curvate pattern which interfit so that a selected relative position therebetween is retained, while not depending only on the tightness of the screw alone. Thus vertical angle adjustability is provided between the lens and the temple bars.

In FIGS. 3a and 3b, the angling unit 25 includes face plates 26 which are integrally formed together with the temple bar legs 28 and 29.

In FIG. 4, a modified design of angling unit 30 includes face plates 31 and 32, one of which on its edge is calibrated with numerals 33 for adjustable alignment with an arrowhead 34 engraved on the edge of the other face plate.

In FIG. 5 another modified design of angling unit 35 comprises face plates 36 and 37 in which one plate is convex and the other is correspondingly concave, so that there is a large tooth engaging surface thus allowing the unit 35 to be made smaller.

In FIG. 6 a further modified angling unit 38 is shown in which the mating face is conically toothed rather than cylindrically toothed as suggested in FIG. 5. In FIG. 7 a further modified design 39 of the invention provides the temple bar 40 being in one piece fixedly secured to a face plate 41 angularly adjustably securable to a face plate 42 which at the same time forms a hinge plate of a hinge 43 having another hinge plate 44 secured fixedly to lens frame 45.

In FIGS. 8 and 9, angling unit 46 includes face plates 47 and 48 which, instead of the above described radial teeth, has toothed projections 49 on one plate that are engagable in circular depressions 50 on the other plate. The teeth may have flat ends and the depression bottoms correspondingly may be flat as shown. In a further modified design of angling unit 51 shown in FIG. 10 the projecting teeth 52 may be conically tapered to a point so to fit in a correspondingly shaped opening 53 conically tapered to a point.

In FIGS. 11 and 12 a modified design 54 of the invention permits a more fine adjustment than is possible by employment of angling units having teeth. This consist of a rotatable worm gear 55 supported on shaft 56 supported on leg 57 of temple bar leg 58. The gear engages a worm 59 secured on shaft 60 of knob 61, the shaft being supported rotatably through bracket 62 having bifurcated arms secured firmly by rivets 63 to temple bar leg 64. Coarse adjustment of the knob results in fine adjustment of the angular displacement of leg 64 respective to leg 58 as shown by arrow 65.

In FIG. 13 another modified design 66 the invention allows each lens 67 to be universally adjustable in angle respective to lens frame 68 by means of a universal joint 69.

Thus different forms of the invention have been provided.

While various changes may be made in the detail construction, it is understood that such changes will be within the spirit and scope of the present invention as is defined by the appended claims.

What is claimed is:

1. An eye glass frame construction comprising a lens frame and a pair of temple bars secured pivotally to the frame at each end whereby the bars pivot inwardly towards the frame and outwardly to assume a position at right angles to said frame, each bar including an outer portion pivotally secured to said bars by means whereby said outer portion can be pivoted about an axis perpendicular to the bar, said means comprising overlapping abutting and relatively pivotable surfaces on said bar and outer portion including a pivot pin mounted through said surfaces at right angles to the bar, further including interacting teeth on said surfaces to maintain the bar and portion at a predetermined angular postion, wherein each said surface is formed on a disc having aligned central bores to receive said pivot pin, one of said bores being threaded to coact with threads on said pin to lock the discs against rotation, including arms on said discs extending in opposite directions for securement to said bar and outer portion, and said interacting teeth include meshed corrugations in a curvate pattern relative to the axis of rotation of said outer portion relative to said bar.

2. An eye glass frame construction comprising a lens frame and a pair of temple bars secured pivotally to the frame at each end whereby the bars pivot inwardly towards the frame and outwardly to assume a position at right angles to said frame, each bar including an outer portion pivotally secured to said bars by means whereby said outer portion can be pivoted about an axis perpendicular to the bar, said means comprising overlapping abutting and relatively pivotable surfaces on said bar and outer portion including a pivot pin mounted through said surfaces at right angles to the bar, further including interacting teeth to maintain the bar and portion at a predetermined angular position, wherein said surfaces and interacting teeth include a disc-like projection having gear teeth and the outer portion includes a worm rotatably mounted about an axis perpendicular to said pivot pin axis, said worm being in operative engagement with said teeth, said outer portion having bifurcated arms parallel to and pivotable relative to the said projection, whereby said pivot pin is mounted through the said projection and arms.

* * * * *